United States Patent
Shi

(10) Patent No.: US 10,746,577 B2
(45) Date of Patent: Aug. 18, 2020

(54) MAGNETIC FLOWMETER WITH AUTOMATIC IN-SITU SELF-CLEANING

(71) Applicant: Micro Motion Inc., Boulder, CO (US)

(72) Inventor: Xiaochun Shi, Nanjing (CN)

( * ) Notice: Subject to any disclaimer, the term of this patent is extended or adjusted under 35 U.S.C. 154(b) by 461 days.

(21) Appl. No.: 15/398,175

(22) Filed: Jan. 4, 2017

(65) Prior Publication Data

US 2017/0115146 A1    Apr. 27, 2017

Related U.S. Application Data

(63) Continuation of application No. PCT/CN2015/082819, filed on Jun. 30, 2015.

(51) Int. Cl.
| | |
|---|---|
| *G01F 1/58* | (2006.01) |
| *B08B 3/12* | (2006.01) |
| *G01F 1/60* | (2006.01) |
| *G01F 15/12* | (2006.01) |
| *G01F 25/00* | (2006.01) |

(52) U.S. Cl.
CPC .............. *G01F 1/584* (2013.01); *B08B 3/12* (2013.01); *G01F 1/58* (2013.01); *G01F 1/60* (2013.01); *G01F 15/12* (2013.01); *G01F 25/0007* (2013.01)

(58) Field of Classification Search
None
See application file for complete search history.

(56) References Cited

U.S. PATENT DOCUMENTS

| | | | | |
|---|---|---|---|---|
| 3,479,873 A | | 11/1969 | Hermanns | |
| 3,664,191 A | * | 5/1972 | Hermanns | G01F 15/12 73/861.12 |
| 3,839,912 A | * | 10/1974 | Schmoock | G01F 1/58 73/861.12 |
| 4,033,830 A | * | 7/1977 | Fletcher, III | G01N 27/49 73/861.02 |

(Continued)

FOREIGN PATENT DOCUMENTS

| | | |
|---|---|---|
| CN | 1421702 A | 6/2003 |
| EP | 1108988 A1 | 12/1999 |

(Continued)

OTHER PUBLICATIONS

International Search Report and Written Opinion for International Patent Application No. PCT/CN2015/082819, dated Apr. 1, 2016, 8 pages.

(Continued)

*Primary Examiner* — Harshad R Patel
(74) *Attorney, Agent, or Firm* — Chrisopher R. Christenson; Kelly, Holt & Christenson PLLC

(57) ABSTRACT

A magnetic flowmeter includes flowmeter electronics and a flowtube configured to receive process fluid flow. The flowtube has a plurality of electrodes disposed proximate an inner diameter to contact process fluid. At least one ultrasonic transducer is disposed within the flowtube and is configured to couple ultrasonic energy to the process fluid proximate at least one electrode. Flowmeter electronics are coupled to the plurality of electrodes and the at least one ultrasonic transducer and are configured to detect at least partial electrode coating or buildup and responsively generate a cleaning cycle within the flowtube using the at least one ultrasonic transducer.

14 Claims, 5 Drawing Sheets

(56) References Cited

U.S. PATENT DOCUMENTS

| | | | | |
|---|---|---|---|---|
| 4,279,166 A * | 7/1981 | Gryn | G01F 1/584 | |
| | | | 73/861.12 | |
| 4,287,774 A * | 9/1981 | Grebe, Jr. | G01F 1/584 | |
| | | | 73/861.17 | |
| 4,297,895 A * | 11/1981 | Gryn | G01F 15/12 | |
| | | | 73/861.12 | |
| 4,297,896 A * | 11/1981 | May | G01F 15/12 | |
| | | | 73/861.12 | |
| 4,297,897 A * | 11/1981 | Young | G01F 15/12 | |
| | | | 73/861.12 | |
| 5,136,882 A * | 8/1992 | Wada | B08B 9/0322 | |
| | | | 73/198 | |
| 5,370,000 A | 12/1994 | Herwig et al. | | |
| 6,085,599 A * | 7/2000 | Feller | G01F 1/60 | |
| | | | 73/861.13 | |
| 6,231,516 B1 * | 5/2001 | Keilman | A61B 5/0031 | |
| | | | 600/481 | |
| 6,611,775 B1 | 8/2003 | Coursolle et al. | | |
| 2007/0143041 A1 | 6/2007 | Budmiger | | |
| 2011/0204749 A1* | 8/2011 | Buccafusca | G01N 29/223 | |
| | | | 310/324 | |
| 2012/0174650 A1* | 7/2012 | Ariessohn | B08B 3/12 | |
| | | | 73/23.2 | |
| 2012/0187801 A1* | 7/2012 | Matsuo | G10K 11/004 | |
| | | | 310/334 | |
| 2014/0150182 A1* | 6/2014 | Nishihara | A61B 6/0435 | |
| | | | 5/601 | |
| 2016/0349157 A1* | 12/2016 | Brown | F01N 3/208 | |

FOREIGN PATENT DOCUMENTS

| | | |
|---|---|---|
| GB | 20575922 A | 4/1981 |
| JP | S51-001142 | 1/1976 |
| JP | S52-114752 | 3/1977 |
| JP | S54143257 A | 11/1979 |

OTHER PUBLICATIONS

First Office Action dated Dec. 11, 2018 for Chinese Patent Application No. 201580002872.4, 11 pages including English translation.
Extended European Search Report dated Feb. 22, 2019, for European Patent Application No. 15896745.5, pp. 10.
Decision of Rejection, deted Aug. 14, 2018, for Japanese Patent Application No. 2017-587621, 9 pages including English translahon.
Decision of Rejection dated Jul. 30, 2019 for Japanese Patent Application No. 2017-567821, with English translation. 6 pages.

* cited by examiner

MAGNETIC FLOWMETER WITH AUTOMATIC IN-SITU SELF-CLEANING

CROSS-REFERENCE TO RELATED APPLICATION

This Application is a continuation application filed under 35 U.S.C. 111(a) and claims benefit of International Application No. PCT/CN2015/082819, filed Jun. 30, 2015, the contents of which are hereby incorporated by reference in their entirety.

BACKGROUND

Magnetic flowmeters (or mag meters) measure flow by application of Faraday's Law, an electromagnetic effect. The magnetic flowmeter energizes one or more coils by passing an excitation current through field windings which generates a magnetic field across an electrically isolated, conductive process fluid flow. An electromotive force (EMF) is generated by the flowing process fluid crossing through the magnetic field. This induced voltage (potential) both across the fluid and with respect to the rest of the process fluid can readily be measured by one or more conductive electrodes that contact the flowing process fluid. The volumetric flow is proportional to the flow velocity and the cross-sectional area of the flowtube. The flow velocity is directly proportional to the electrode voltage potential (EV), which is directly proportional to the induced magnetic field strength (B). The induced magnetic field strength is assumed to be proportional to the applied magnetic field (H), which is directly linked to the magnitude of the excitation current. Thus, a direct correlation is provided between the measured electrode voltage potential and indicated volumetric flow.

Magnetic flowmeters are useful in a variety of conductive and semi-conductive fluid flow measurement environments. In particular, the flow of water-based fluids, ionic solutions and other conducting fluids can all be measured using magnetic flowmeters. Thus, magnetic flowmeters can be found in water treatment facilities, beverage and hygienic food production, chemical processing, high purity pharmaceutical manufacturing, as well as hazardous and coercive processing facilities.

In order to operate effectively, the electrical conductivity of the path extending between the electrodes of the magnetic flowmeter must be relatively high. The overall resistance of this path is determined by that of the fluid itself in series with the interface resistance across the fluid and the surfaces of the electrodes. When magnetic flowmeters measure relatively dirty fluids, such as fluids containing oils or sludge, the contaminants may occasionally coat and adhere to the active surfaces of the electrodes. This coating can change the electrical characteristics of the electrodes and, as the coatings build up, generate an interface resistance that causes measurement errors.

It is known to use ultrasonic cleaning on the electrodes of magnetic flowmeters, particularly when the magnetic flowmeters are used for metering slow-moving liquids which have a tendency to coat the electrodes. The ultrasonic cleaning may, for example, consist of ultrasonic transducers in the form of piezoelectric discs that are positioned in or on the electrode bodies and that are energized periodically by an ultrasonic frequency generator.

SUMMARY

A magnetic flowmeter includes flowmeter electronics and a flowtube configured to receive process fluid flow. The flowtube has a plurality of electrodes disposed proximate an inner diameter to contact process fluid. At least one ultrasonic transducer is disposed within the flowtube and is configured to couple ultrasonic energy to the process fluid proximate at least one electrode. Flowmeter electronics are coupled to the plurality of electrodes and the at least one ultrasonic transducer and are configured to detect at least partial electrode coating or buildup and responsively generate a cleaning cycle within the flowtube using the at least one ultrasonic transducer.

DETAILED DESCRIPTION OF ILLUSTRATIVE EMBODIMENTS

Figure 1:
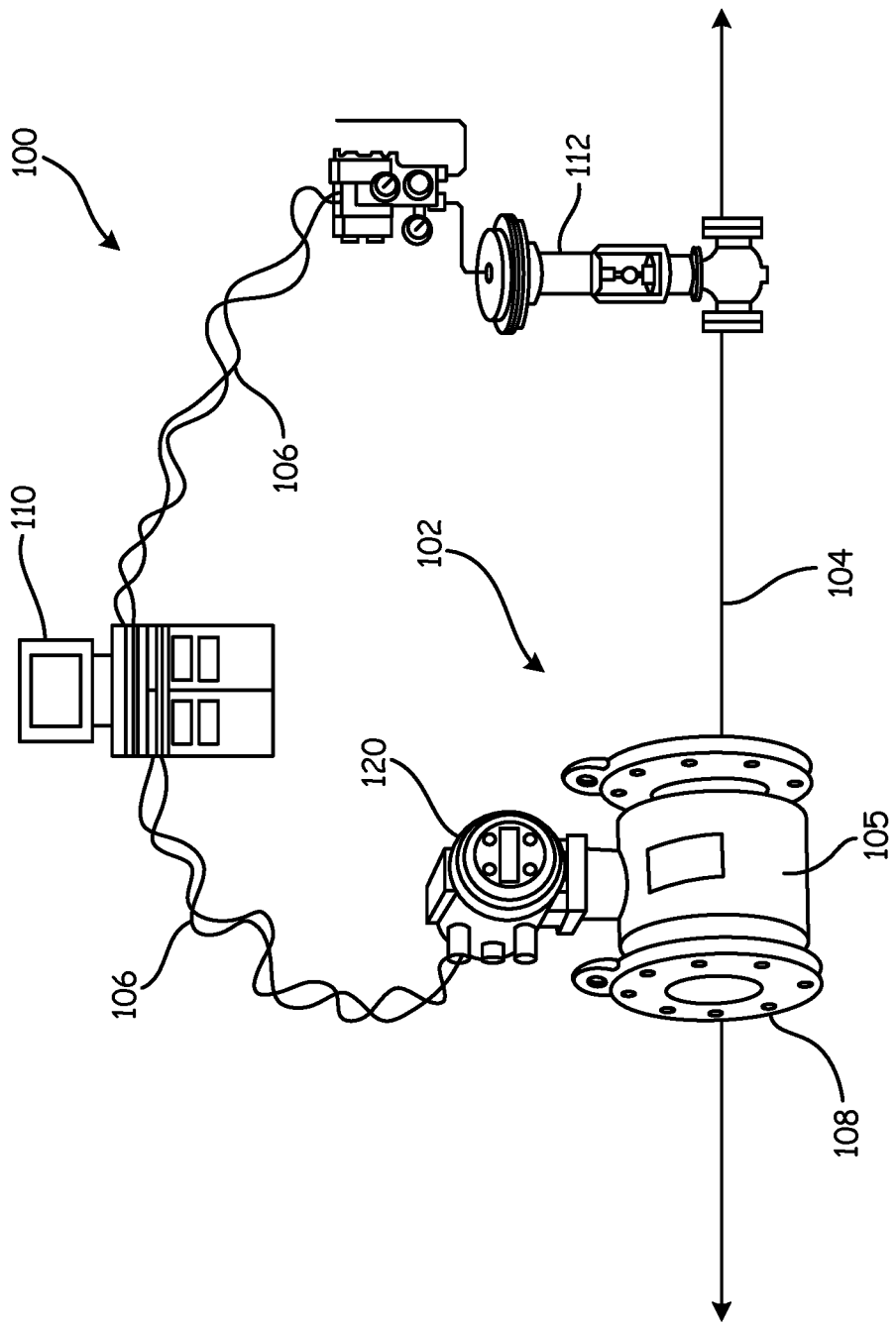
FIG. 1 is a diagrammatic view of an environment in which magnetic flowmeters in accordance with embodiments of the present invention are useful.

FIG. 1 illustrates a typical environment 100 for magnetic flowmeter 102. Magnetic flowmeter 102 is coupled to process piping, illustrated diagrammatically at line 104 that also couples to control valve 112. Magnetic flowmeter 102 is configured to provide a flow rate output relative to process fluid flow through piping 104 in a process. Examples of such fluids include slurries and liquids in chemical, pulp, pharmaceutical and other fluid processing plants.

Magnetic flowmeter 102 includes electronics housing 120 connected to flowtube 108. Magnetic flowmeter 102 outputs are configured for transmission over relatively long distances to a controller or indicator via process communication connection 106. In typical processing plants, communication connection 106 can be either a digital communication protocol or an analog communication signal. The same or additional process information can be made available via wireless communication, pulse width or frequency output, or discrete input/outputs (DI/DO). System controller 110 can display flow information for a human operator as well as provide control signals over process communication connection 106 in order to control the process using control valves, such as valve 112.

Figure 2:
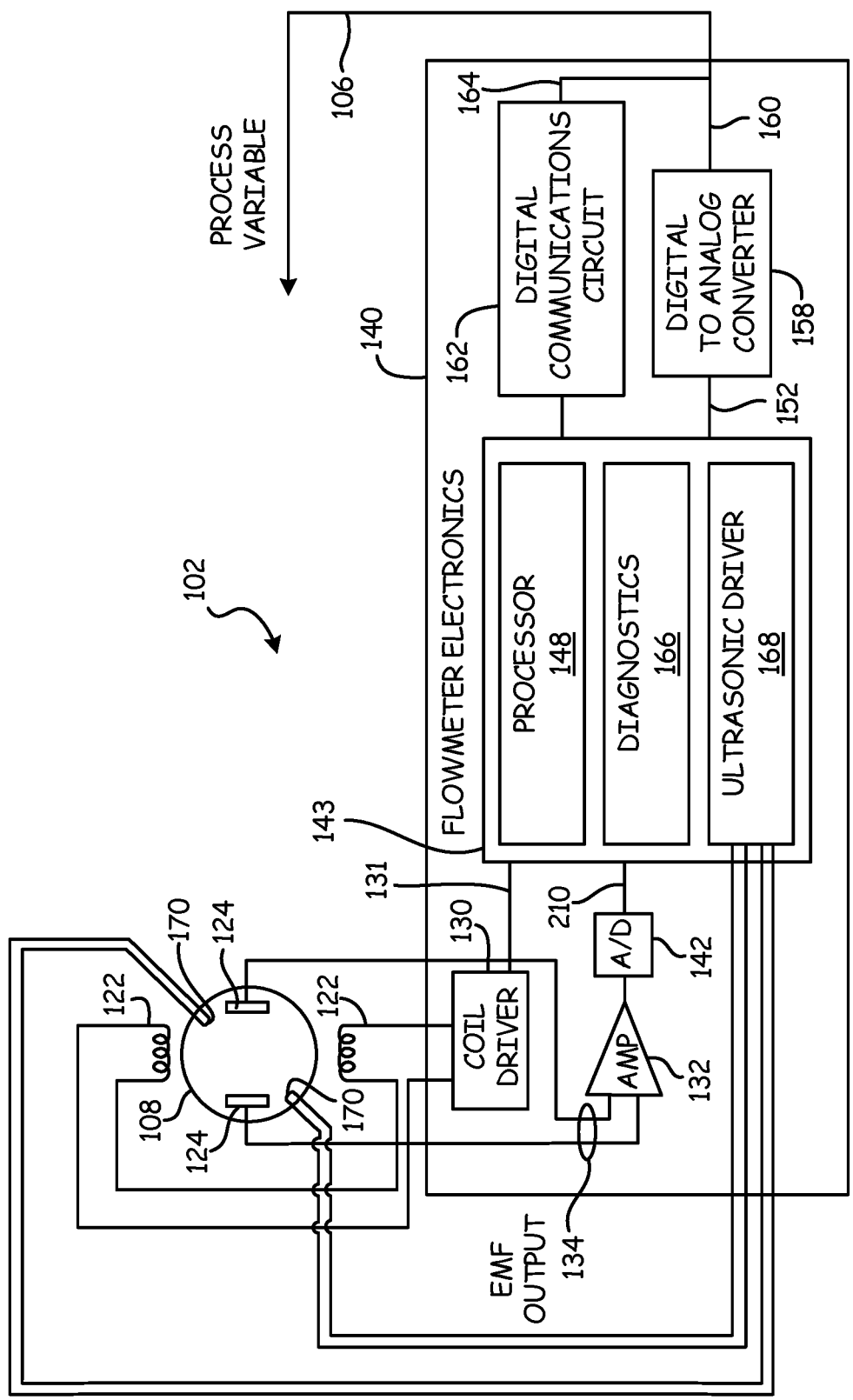
FIG. 2 is a block diagram of a magnetic flowmeter in accordance with an embodiment of the present invention.

FIG. 2 is a block diagram of a magnetic flowmeter in accordance with an embodiment of the present invention. Magnetic flowmeter 102 measures a flow of conductive process fluid through flowtube assembly 108. Coils 122 are configured to apply an external magnetic field in the fluid flow in response to an applied excitation current from coil driver 130. EMF sensors (electrodes) 124 electrically couple to the fluid flow and provide an EMF signal output 134 to amplifier 132 related to an EMF generated in the fluid flow due to the applied magnetic field, fluid velocity, and noise. Analog-to-digital converter 142 provides a digitized EMF signal to microprocessor system 148 of flowmeter electronics 143. Microprocessor 148 may be configured, through hardware, software, or a combination thereof, to provide digital signal processing functions relative to EMF output 134 in order to provide an output 152 related to fluid velocity.

Microprocessor system 148 calculates fluid flow velocity through flowtube 108 in accordance with a relationship between the EMF output 134 and flow velocity as described in an application of Faraday's Law:

$$V = \frac{E}{kBD}$$

Where E can be the signal output 152 which is related to the EMF output 134, V is the velocity of the fluid, D is the diameter of flowtube 108, B is the strength of the induced magnetic field in the process fluid, and k is a constant of proportionality. Microprocessor 148 uses velocity and the measured magnetic field or coil current to calculate flow of the process fluid in accordance with known techniques. A digital-to-analog converter 158 is coupled to microprocessor 148 of flowmeter electronics 143 and generates an analog transmitter output 160 for coupling to communication bus 106. A digital communication circuit 162 may generate a digital transmitter output 164. The analog output 160 and/or digital output 164 can be coupled to process controllers or monitors, as desired.

In accordance with an embodiment of the present invention, flowmeter electronics 143 of magnetic flowmeter 102 includes diagnostics component 166 and ultrasonic driver 168. Diagnostics component 166 may be separate from or embodied within microprocessor 148. Diagnostics component 166 is configured, via hardware, software, or a combination thereof to provide a diagnostic indication relative to fouling or other adhesion of material to one or more of electrodes 124. Diagnostics component 166 can employ any diagnostics techniques for measuring or interacting with electrodes 124 in order to provide a diagnostic output indicative of electrode coating. In one example, the diagnostic technique may be the same as that as employed by U.S. Pat. No. 5,370,000, which teaches the detection of electrode coating in a magnetic flowmeter. However, any other suitable techniques that are able to provide an indication relative to electrode coating can be used. When diagnostic component 166 determines that one or more of electrodes 124 have suffered a certain level of material buildup or at least partially coating, flowmeter electronics 143 are configured to responsively engage ultrasonic driver component 168 to cause one or more ultrasonic transducers 170 to generate ultrasonic energy within the flowing process fluid. In one example, ultrasonic transducers 170 may be a piezoelectric or magnetostrictive components. Suitable examples of such structures ceramic lead zirconium titanate elements that operate in the kilohertz range.

The use of ultrasonic cleaning techniques of electrodes in magnetic flowmeters is provided in U.S. Pat. Nos. 3,479,873 and 4,287,774. However, modern magnetic flowmeters are of such precision and mechanical integrity that directly coupling an ultrasonic transducer to an electrode is disfavored. Instead, embodiments of the present invention generally provide one or more ultrasonic transducers within a flowtube of a magnetic flowmeter at one or more locations that are selected to generate ultrasonic energy proximate the electrodes without actually allowing the ultrasonic transducers to contact the electrodes. Additionally, the ultrasonic transducers themselves can also be used by suitable diagnostic components, such as diagnostic circuitry 166 and/or ultrasonic driver 168 to inferentially determine when electrodes 124 may be dirty. For example, if transducers 170 contact the process fluid, then it may be inferred that when the transducers become dirty or fouled, that the electrodes will also be fouled. Since the adhesion of solids or other contamination to the transducers will change the mass of the transducers, the resonant frequency of such transducer will change dramatically. Accordingly, by applying different drive frequencies to the transducers 170 and measuring or otherwise obtaining responses of the transducers, changes in resonant frequency can be measured. These changes in resonant frequency can be used to infer electrode coating diagnostics. Further still, the transducer-based diagnostics can be combined with traditional electrode-coating based diagnostics to provide a more robust indication of when in-situ ultrasonic cleaning is appropriate.

In one embodiment, when flowmeter 102 is to begin ultrasonic cleaning of the electrodes, normal flowmeter operation and the provision of process flow information is halted. Thus, the generation of the magnetic field via coils 122 is interrupted and transducers 170 are engaged by ultrasonic driver 168. This self-cleaning operation can last for a pre-determined amount of time, or the process can be interrupted and an electrode coating diagnostic can be generated in order to determine whether sufficient cleaning has occurred. If additionally cleaning is required, the ultrasonic transducers 170 can be engaged again and the cleaning operation can be continued. This iterative diagnostic/cleaning cycle can continue until a pre-determined amount of time has elapsed. If, after such pre-determined amount of time has elapsed, the diagnostics still indicate electrode coating, then microprocessor 148 can provide an indication to a process controller over communication bus 106 that the cleaning operation has not been successful and that technician intervention is required. As set forth above, embodiments of the present invention generally provide ultrasonic transducers in relatively close proximity to, but separated from, one or more electrodes of the magnetic flowmeter.

Figure 3A:
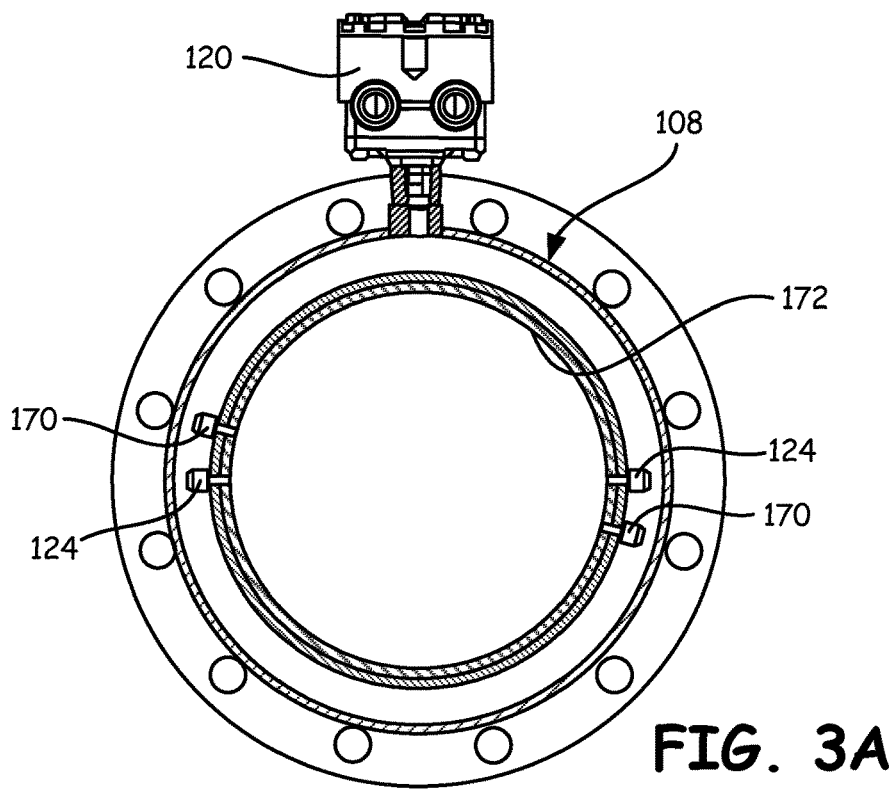
FIG. 3A is a diagrammatic cross-sectional view of a magnetic flowmeter in accordance with an embodiment of the present invention.

FIG. 3A is a diagrammatic cross-sectional view of a magnetic flowmeter in accordance with the embodiment of the present invention. As shown, electrodes 124 are disposed opposite one another within flowtube 108. Each of electrodes 124 passes through electrically-insulating liner 172 and thus contacts process fluid flowing through flowtube 108. Each of electrodes 124 is positioned near a respective ultrasonic transducer 170. However, as shown in FIG. 3A, ultrasonic transducers 170 are physically separated from their respective electrodes. When in-situ cleaning is being performed by flowmeter 102, each ultrasonic transducer 170 generates motion within the process fluid at an ultrasonic frequency. This ultrasonic energy, introduced into the process fluid, causes the ultrasonically-excited process fluid to clean the nearby surfaces of electrodes 124.

Figure 3B:
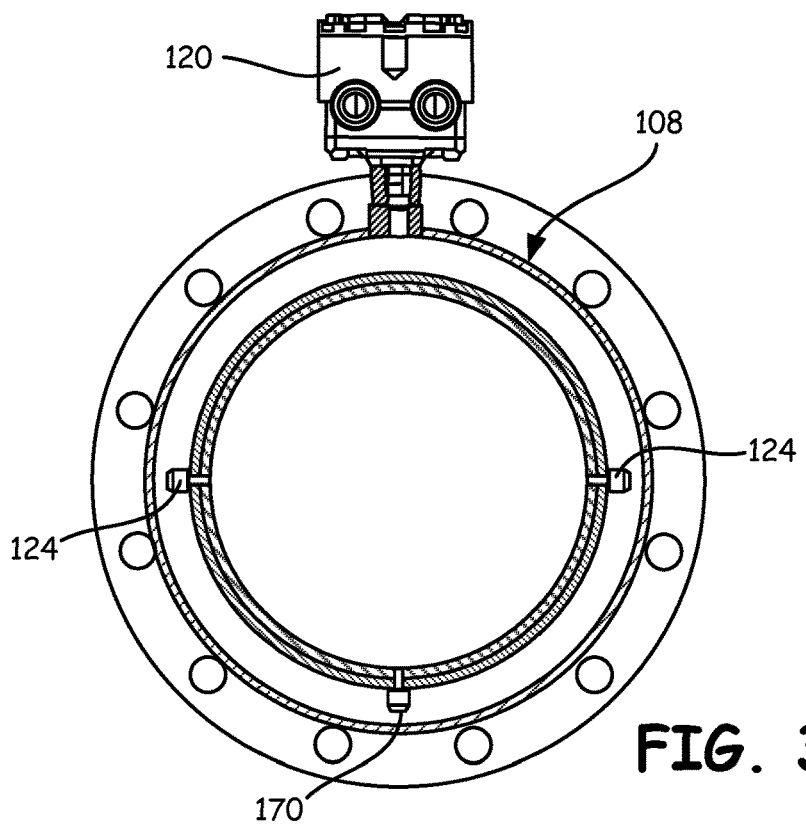
FIG. 3B is a diagrammatic cross-sectional view of a magnetic flowmeter in accordance with another embodiment of the present invention.

FIG. 3B is a diagrammatic cross-sectional view of a magnetic flowmeter in accordance with another embodiment of the present invention. The magnetic flowmeter includes an electronics housing 120, as described above with respect to FIGS. 1 and 2. Additionally, flowtube 108 of the magnetic flowmeter includes a pair of diametrically opposed electrodes 124. Similar to the embodiment shown with respect to FIG. 3A, FIG. 3B has electrodes 124 positioned at approximately 0 and 180 degrees. In contrast, however, a single ultrasonic transducer 170 is positioned at approximately 270 degrees. While ultrasonic transducer 170 is radially spaced from electrodes 124, it is still considered to be positioned proximate electrodes 124 by virtue of its axial position within the flowtube. When in-situ ultrasonic cleaning is desired, transducer 170 is caused to generate movement having an ultrasonic frequency. This movement excites the process fluid within flowtube 108 and causes the ultrasonically-excited process fluid to clean electrodes 124.

Figure 3C:
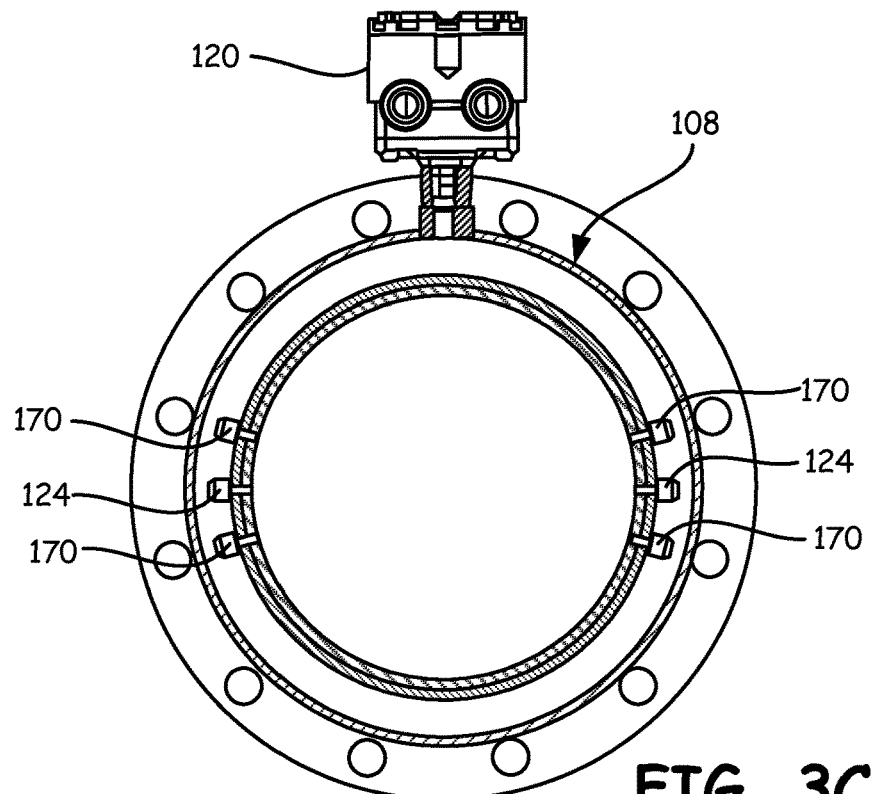
FIG. 3C is a diagrammatic cross-sectional view of a magnetic flowmeter in accordance with another embodiment of the present invention.

FIG. 3C is a diagrammatic cross-sectional view of a magnetic flowmeter in accordance with another embodiment of the present invention. As shown in FIG. 3C, each electrode 124 has a pair of ultrasonic transducers 170 nearby. In the illustrated embodiment, each pair of ultrasonic transducers includes a first ultrasonic transducer spaced in a first radial direction from the respective electrode and a second ultrasonic transducer spaced in a second radial direction that is opposite to the first radial direction. In one embodiment, the first and second ultrasonic transducers may be spaced equidistant from the respective electrode. Thus, for two electrodes, a total of four ultrasonic transducers 170 are shown. The utilization of additional ultrasonic transducers 170 may allow the magnetic flowmeter to couple more ultrasonic energy into the process flow and provide more vigorous ultrasonic cleaning for more difficult media. Additionally, the utilization of an ultrasonic transducer both below and above each electrode 124 may allow ultrasonic transducer-based diagnostic methods to be used more effectively alone or in combination with electrode-coating diagnostic techniques to determine appropriate times to generate in-situ cleaning cycles.

Figure 3D:
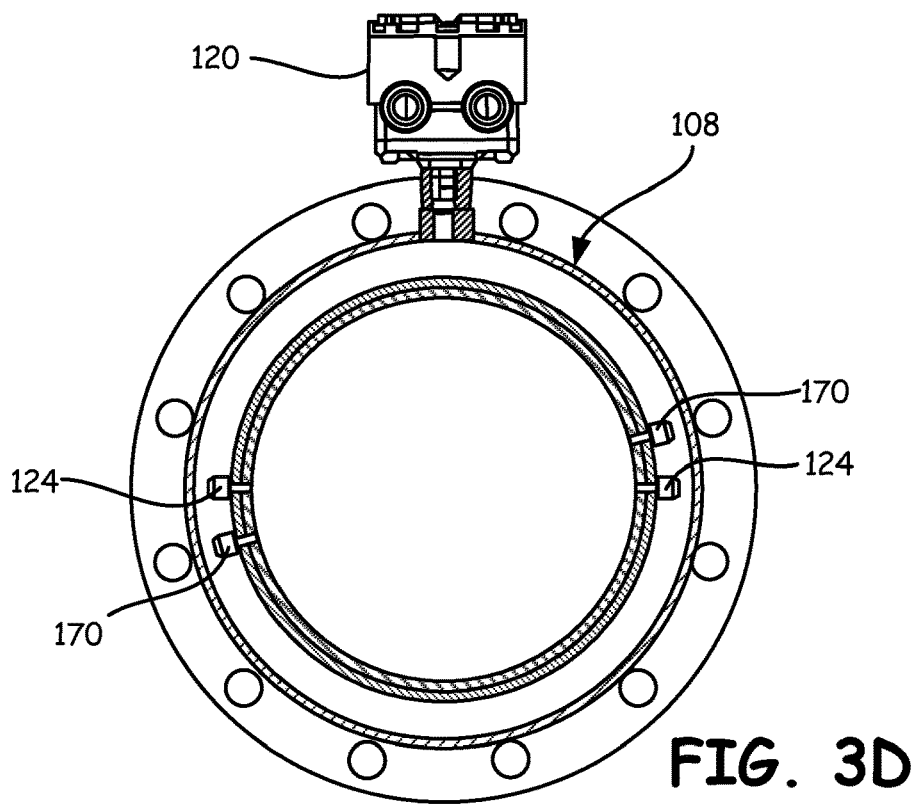
FIG. 3D is a diagrammatic cross-sectional view of a magnetic flowmeter in accordance with another embodiment of the present invention.

FIG. 3D is a diagrammatic cross-sectional view of a magnetic flowmeter in accordance with another embodiment of the present invention. FIG. 3D is similar to FIG. 3A except that the transducers are flipped about the horizontal axis with respect to FIG. 3A. Thus, each electrode is disposed on an opposite side of a diameter. In the example shown, the diameter extends from the 0 degree position to the 180 degree position. In the embodiments shown in FIGS. 3A and 3D, the ultrasonic transducer is disposed on an opposite side of the diameter. For example, in FIG. 3D, an ultrasonic transducer is positioned at about 20 degrees, thus above the diameter that extends from 0-180 degrees. The other ultrasonic transducer is located at about 200 degrees, and thus below the diameter that extends from 0-180 degrees.

Thus, FIGS. 3A-3C indicate that a variety of configuration options can be provided for placement of one or more ultrasonic transducers in a flowtube of a magnetic flowmeter in accordance with the embodiments of the present invention. Additionally, while embodiments described thus far have generally shown the ultrasonic transducers spaced radially from the electrodes, it is also contemplated that the ultrasonic transducers could be spaced in the direction of fluid flow (i.e. upstream).

Figure 4:
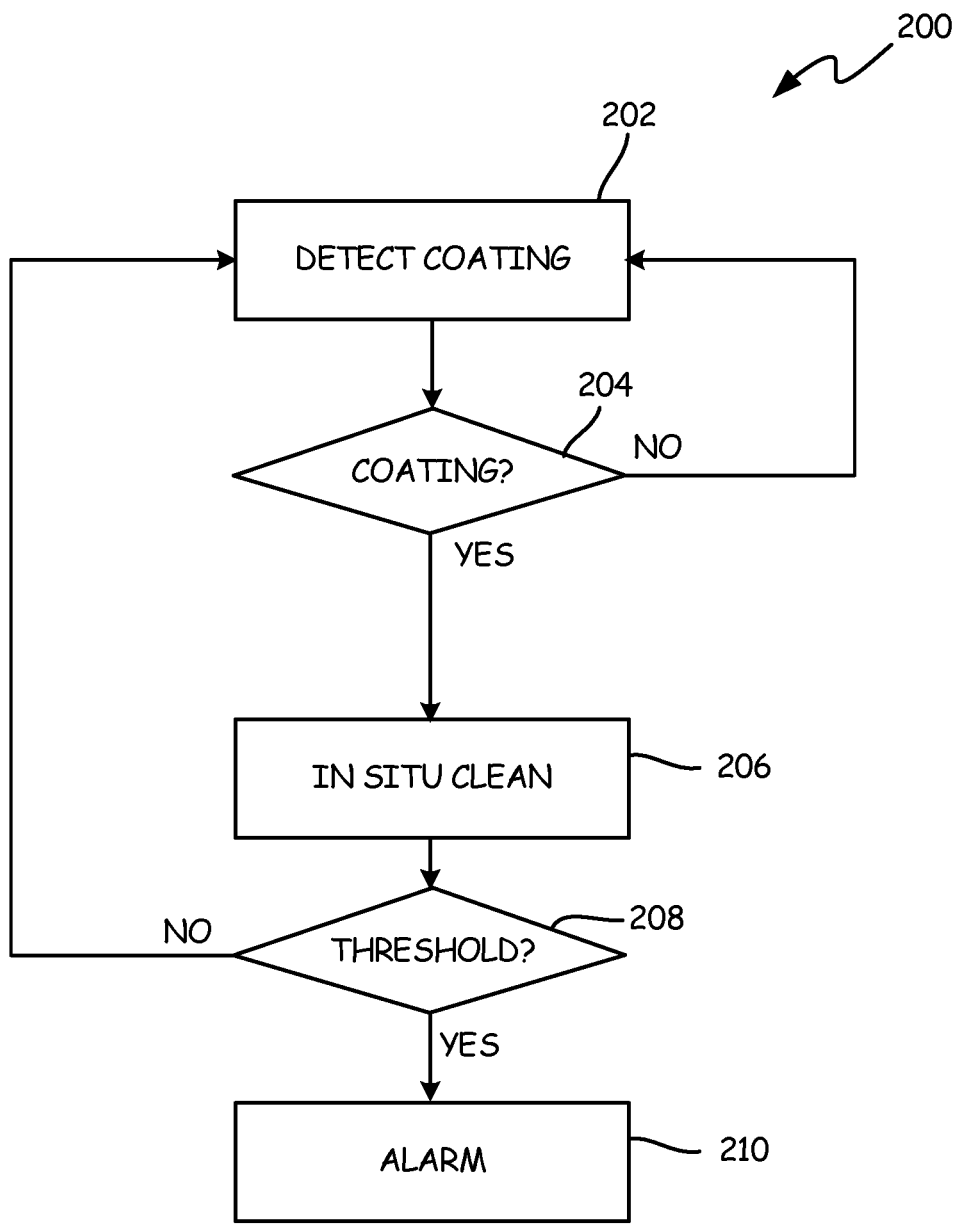
FIG. 4 is a flow diagram of a method of detecting electrode coating and generating an in-situ electrode cleaning process in accordance with an embodiment of the present invention.

FIG. 4 is a flow diagram of a method of detecting electrode coating and generating an in-situ electrode cleaning process in accordance with an embodiment of the present invention. Method 200 begins at block 202 where coating detection is performed. This coating detection can be any suitable electrode coating diagnostics that are now known or later developed. Additionally, or alternatively, coating detection relative to one or more ultrasonic transducers can be used to inferentially determine electrode coating within the flowtube.

Once the coating detection of block 202 has completed, block 204 determines if the amount of coating detected is above a selected threshold. If not, control returns to block 202 after a selected amount of time. In this way, the magnetic flowmeter will periodically perform an electrode coating detection, either directly or indirectly, and continue to operate normally if the detected coating thickness is below a selected threshold. However, if the detected coating thickness is above the selected threshold, control passes to block 206 where an in-situ electrode cleaning operation is performed.

In order to perform the in-situ electrode cleaning operation of block 206, flowmeter electronics, such as processor 148 is configured to cause an ultrasonic driver to energize one or more ultrasonic transducers, such as ultrasonic transducers 170, within the flowtube of the magnetic flowmeter. This energization of the ultrasonic transducer(s) couples ultrasonic energy into the process fluid. Then, the process fluid itself is used as the ultrasonic cleaning media on the electrodes, such as electrodes 124, which are in direct contact with the ultrasonically-energized process fluid.

Once the cleaning operation of block 206 has completed, block 208 determines if a number of cleaning operations within a particular amount of time, such as one hour, have completed. If not, control returns to block 202 where detection of electrode coating is again performed. Thus, if the ultrasonic cleaning operation of block 206 is successful, the detection at block 202 will indicate that the coating on the electrodes is below a selected threshold, and operation will continue as normal. However, in the event that the in-situ cleaning process is not successful at removing or otherwise dislodging material on the electrodes, the method will iterate until the number of cleaning cycles within a particular amount of time reaches the threshold. At such time, control will pass to block 210 where the magnetic flowmeter will indicate, either locally, remotely, or both, that an alarm condition exists due to electrode coating. Thus, the process operator will be alerted to the condition and the magnetic flowmeter will no longer be relied upon to provide accurate process fluid flow measurements. Further, a technician can be dispatched to the magnetic flowmeter to manually clean the flowtube and/or replace defective components, as appropriate.

Although the present invention has been described with reference to preferred embodiments, workers skilled in the art will recognize that changes may be made in form and detail without departing from the spirit and scope of the invention.

What is claimed is:
1. A magnetic flowmeter comprising:
a flowtube configured to receive process fluid flow, the flowtube having a plurality of electrodes disposed proximate an inner diameter to contact process fluid;
a plurality of ultrasonic transducers disposed within the flowtube with each ultrasonic transducer being disposed proximate a respective electrode of the plurality of electrodes and configured to couple ultrasonic energy to the process fluid proximate the respective electrode;
flowmeter electronics coupled to the plurality of electrodes and the plurality of ultrasonic transducers, the flowmeter electronics being configured to detect at least partial electrode coating or buildup and responsively generate a cleaning cycle within the flowtube using the plurality of ultrasonic transducers, the flowmeter electronics including:

ultrasonic driver circuitry coupled to at least one ultrasonic transducer of the plurality of ultrasonic transducers and configured to selectably energize at least one ultrasonic transducer of the plurality of ultrasonic transducers during the cleaning cycle, and a diagnostic component configured to detect the at least partial electrode coating, periodically assess potential electrode coating and responsively engage the ultrasonic driver circuit if electrode coating is detected above a predetermined threshold;

wherein the plurality of ultrasonic transducers includes a pair of ultrasonic transducers for each electrode; and wherein at least one ultrasonic transducer of the pair of ultrasonic transducers is spaced from the respective electrode.

2. The magnetic flowmeter of claim 1, wherein each ultrasonic transducer is spaced radially from a respective electrode.

3. The magnetic flowmeter of claim 1, wherein each ultrasonic transducer is spaced longitudinally along the flowtube from a respective electrode.

4. The magnetic flowmeter of claim 1, wherein the plurality of electrodes are disposed opposite one another on a diameter of the flowtube.

5. The magnetic flowmeter of claim 4, wherein one ultrasonic transducer is disposed on one side of the diameter and another ultrasonic transducer is disposed on the other side of the diameter.

6. The magnetic flowmeter of claim 1, wherein the pair of ultrasonic transducers includes a first ultrasonic transducer spaced from a respective electrode in a first radial direction and a second ultrasonic transducer spaced from the respective electrode in a second radial direction opposite the first radial direction.

7. The magnetic flowmeter of claim 6, wherein the first and second ultrasonic transducers are spaced equidistant from the respective electrode.

8. The magnetic flowmeter of claim 1, wherein the flowmeter electronics includes a processor configured to periodically cause the diagnostic component to assess potential electrode coating and responsively engage the ultrasonic driver circuitry if electrode coating is detected above the predetermined threshold.

9. The magnetic flowmeter of claim 8, wherein the processor is further configured to cause the diagnostic component to assess potential electrode coating after the cleaning cycle.

10. A flowtube for a magnetic flowmeter, the flowtube comprising:

a flow conduit configured to receive process fluid;

an electrically insulating liner disposed within the flow conduit and configured to electrically isolate the process fluid from the flow conduit;

a pair of electrodes disposed within the flow conduit and configured to contact process fluid flowing through the flowtube;

a plurality of ultrasonic transducers disposed within the flow conduit, each ultrasonic transducer being disposed proximate a respective electrode of the pair of electrodes, wherein at least one ultrasonic transducer of the plurality of ultrasonic transducers is spaced from the respective electrode; and wherein the plurality of ultrasonic transducers includes a pair of ultrasonic transducers for each electrode.

11. The flowtube of claim 10, wherein at least one ultrasonic transducer of the plurality of ultrasonic transducers is formed of a piezoelectric material.

12. The flowtube of claim 11, wherein the piezoelectric material is lead zirconium titanate.

13. The flowtube of claim 10, wherein at least one ultrasonic transducer of the plurality of ultrasonic transducers is formed of a magnetostrictive material.

14. A magnetic flowmeter comprising:

a flowtube configured to receive process fluid flow, the flowtube having a plurality of electrodes disposed proximate an inner diameter to contact process fluid;

a plurality of ultrasonic transducers disposed within the flowtube and configured to couple ultrasonic energy to the process fluid proximate at least one electrode of the plurality of electrodes;

flowmeter electronics coupled to the plurality of electrodes and at least one ultrasonic transducer of the plurality of ultrasonic transducers, the flowmeter electronics being configured to detect at least partial electrode coating or buildup and responsively generate a cleaning cycle within the flowtube using at least one ultrasonic transducer of the plurality of ultrasonic transducers, the flowmeter electronics including:

a diagnostic component configured to detect the at least partial electrode coating, ultrasonic driver circuitry coupled to at least one ultrasonic transducer of the plurality of ultrasonic transducers and configured to selectably energize at least one ultrasonic transducer of the plurality of ultrasonic transducers during the cleaning cycle, and a processor configured to periodically cause the diagnostic component to assess potential electrode coating and responsively engage the ultrasonic driver circuitry if electrode coating is detected above a predetermined threshold;

wherein the processor is further configured to cause the diagnostic component to assess potential electrode coating after the cleaning cycle; and wherein at least one ultrasonic transducer of the plurality of ultrasonic transducers is spaced from at least one electrode of the plurality of electrodes.

\* \* \* \* \*